United States Patent [19]
Howard

[11] 3,971,020
[45] July 20, 1976

[54] THREE DIMENSIONAL RADAR SYSTEM WITH INTEGRATED PPI PRESENTATION

[75] Inventor: Shirly Lavar Howard, Rolling Hills Estates, Calif.

[73] Assignee: International Telephone and Telegraph Corporation, New York, N.Y.

[22] Filed: Dec. 2, 1966

[21] Appl. No.: 599,348

[52] U.S. Cl. ............................ 343/7.9; 343/11 R; 343/17.1 R
[51] Int. Cl.² ...................... G01S 7/20; G01S 7/28; G01S 9/02
[58] Field of Search ................. 343/7.9, 10, 11, 16, 343/17.1

[56] References Cited
UNITED STATES PATENTS

| | | | |
|---|---|---|---|
| 3,099,833 | 7/1963 | Tucker et al. | 343/16 |
| 3,143,735 | 8/1964 | Martin | 343/10 |
| 3,161,870 | 12/1964 | Pincoffs | 343/17.1 X |
| 3,162,852 | 12/1964 | Altovsky et al. | 343/17.1 |
| 3,311,913 | 3/1967 | Varela | 343/16 |

*Primary Examiner*—Malcolm F. Hubler
*Attorney, Agent, or Firm*—William T. O'Neil

[57] ABSTRACT

A long range volumetric scanning radar system is described, which is capable of simultaneous height finding using a frequency scan (inertialess) technique in the elevation plane, and conventional azimuth scanning (as by rotation of the antenna system) to provide Plan Position Indicator (PPI) coverage. Height finder video is generated relatively rapidly by the elevation frequency scan so that only negligible movement of the antenna in azimuth takes place during each elevation scan cycle. Successively generated discrete partially overlapping pencil beams provide the elevation scan, and a system for adding the video echoes derived from target illumination by these beams is included to provide a PPI presentation which includes all target information up to a predetermined elevation angle. The video addition is accomplished by a novel summing and base clipping arrangement which improves the signal-to-noise ratio of the composite video signal thus obtained.

10 Claims, 3 Drawing Figures

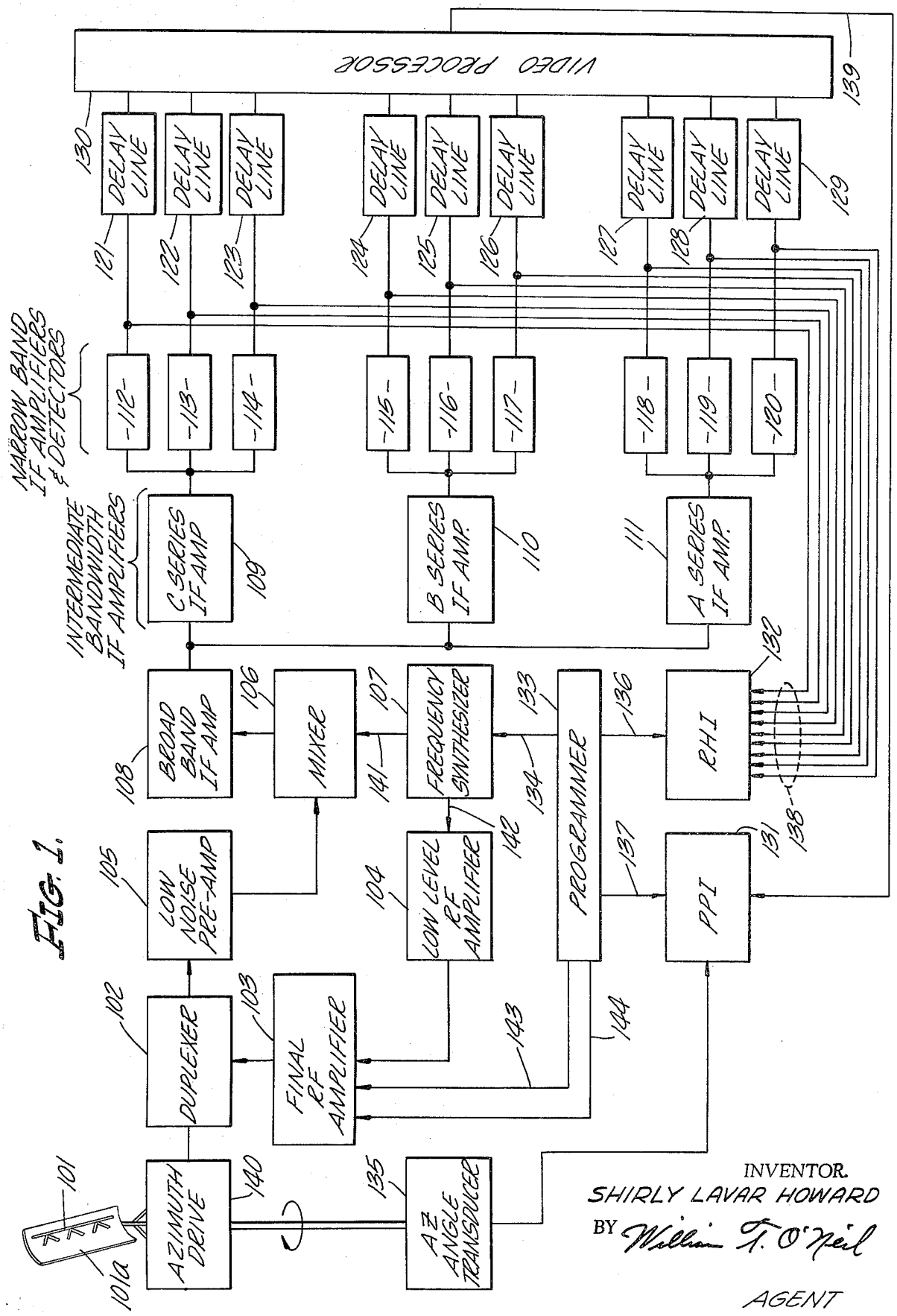

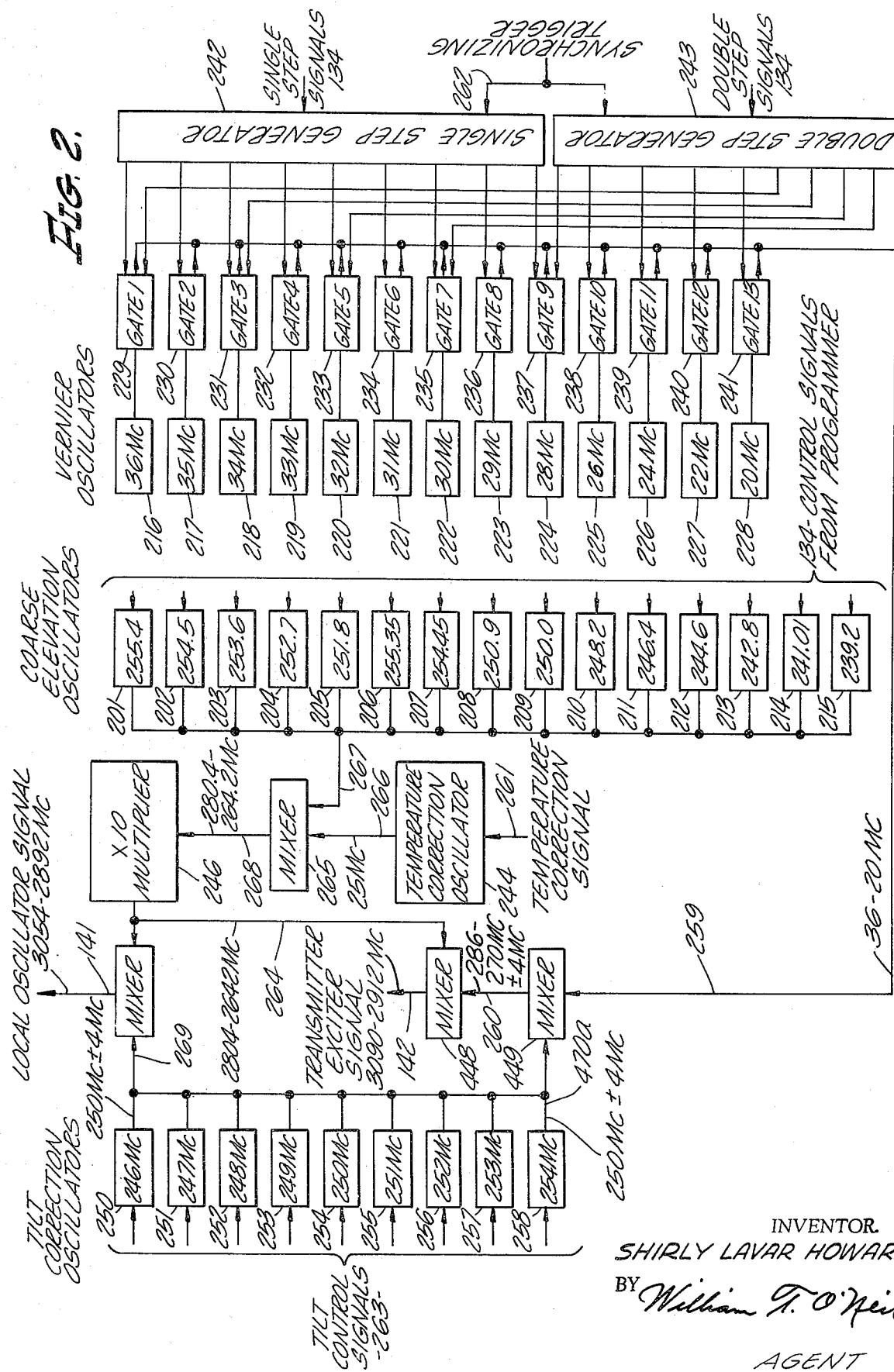

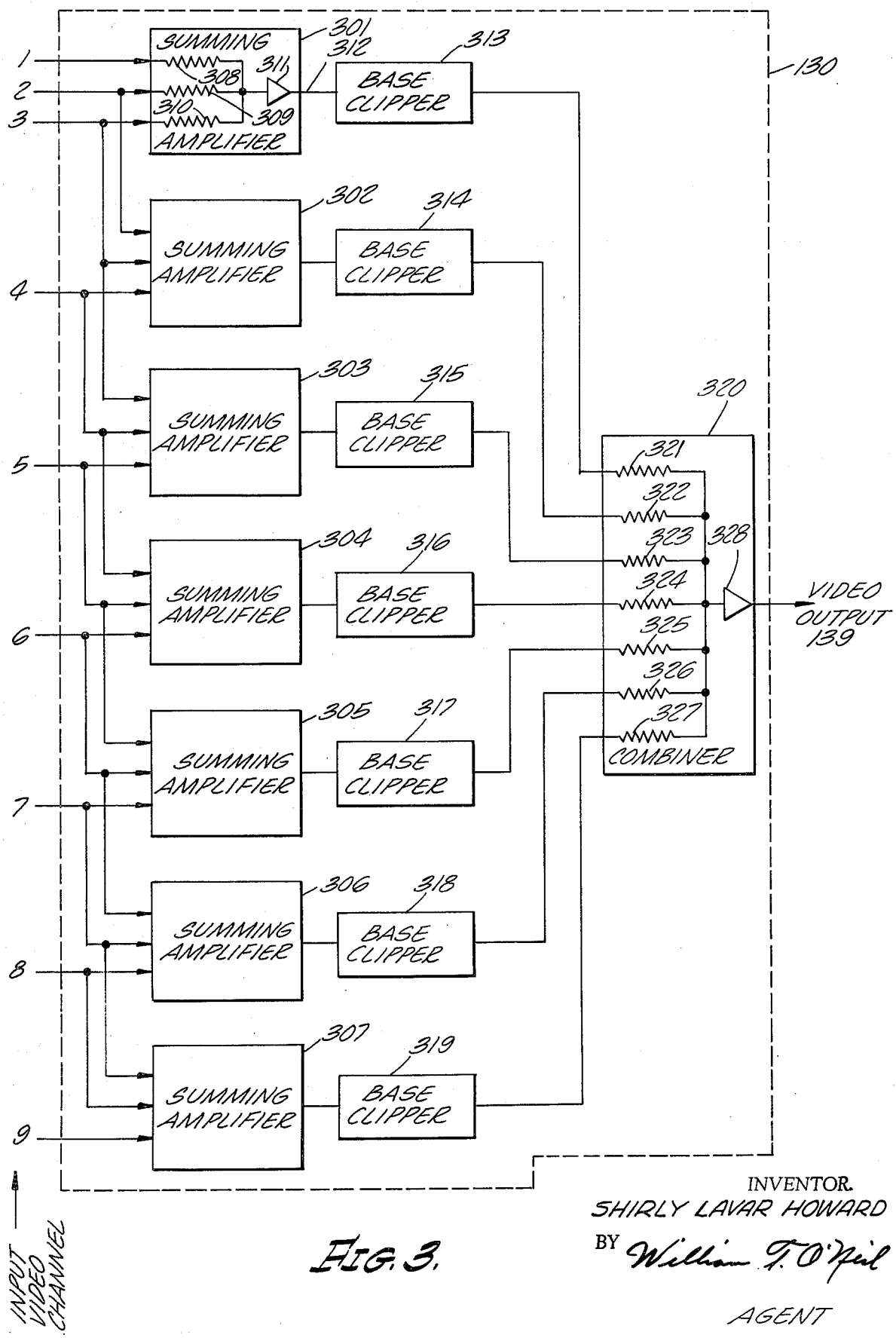

THREE DIMENSIONAL RADAR SYSTEM WITH INTEGRATED PPI PRESENTATION

DESCRIPTION

This invention relates to radar systems and more particularly to radar systems adapted to develop PPI (Plan Position Indicator) and RHI (Range Height Indicator) data simultaneously.

Currently, the development of ground radar systems for commercial aviation, as well as military use, requires long range and high accuracy data in respect to volumetric coordinates, i.e., range azimuth and elevation. Separate PPI and RHI radars have been used to obtain volumetric coverage, however, the disadvantage inherent is the use of separate high powered radar systems with the resulting cost, complexity and difficulty in coordinating target information, is obvious.

Various radar systems have been designed to provide normal PPI information and in addition, to provide correlated height information. In one such equipment, a normal fan shaped beam, relatively narrow in the azimuth plane and broad in the elevation plane, is accompanied by a second beam having a similar shape and being tilted with respect to the vertical. The resulting "V" beam pattern in space, when the two beams are scanned together, provides a basis for obtaining elevation information in that a selected target will be illuminated first by the vertical fan beam and subsequently by the tilted fan beam. If the rate of azimuth rotation of these two beams scanning together is accurately controlled, the difference in time between the first beam illumination and the second beam illumination is, to a first order approximation, proportional to the elevation of the target.

Such a system suffers from at least two serious inherent disadvantages as compared to techniques now available. First, the elevation data rate is very low and second, two very high powered beams are required, each dividing its energy over the total elevation angle of concern.

Recent component developments, including practical inertialess scanners and high powered microwave amplifier tubes such as the "amplitron", have opened up new avenues of development and have made possible new system approaches to the problem of providing contemporaneous PPI and RHI data from a scanning radar system of high performance.

The present invention makes use of a "pencil beam" multi-pulsed scan in the vertical plane using a frequency scan method. This type of inertialess scanning permits maximazation of the data rate within the limitation imposed by the required maximum range.

The use of a pencil beam permits the concentration of all the transmitted power in a small spacial sector. Thus, as compared with the ordinary PPI fan beam, the pencil beam places much more energy "on target" for the same average transmitter power. Accordingly, the range available with the pencil beam is much greater for the same transmitted power. Typically, the power "on target" in the pencil beam rapidly scanned in elevation, is on the order of 20 times that which was possible with a fan beam PPI having similar elevation coverage.

In accordance with the present invention, a frequency-scan three-dimensional radar system designed to provide continuous heightfinding information throughout an arbitrary azimuth sector (up to a full 360°) is utilized to provide a particularly advantageous PPI performance by means of an unique method of combining successive echo signals over the vertical scan sector.

The general object of the invention may be said to be the instrumentation of a combination RHI and PPI radar system with high data rate and simultaneous elevation and azimuth pencil beam scan.

For the purpose of explanation of the present invention, drawings are provided as follows:

FIG. 1 is a simplified overall system block diagram.

FIG. 2 is a detailed diagram of the frequency synthesizer shown in FIG. 1.

FIG. 3 is a block diagram of the Video Processor of FIG. 1.

Referring now to FIG. 1, the antenna includes an array 101, in combination with a reflector 101a. This antenna will be understood to be rotatable in the azimuth plane, and capable of radiating a beam into space. Formation of the pencil beam pattern is accomplished by the reflector 101a in the azimuth plane and by the multi-element broadside collinear array 101 in the elevation plane. This antenna system is, of course, by reciprocity, able to receive energy in accordance with the same pencil beam pattern. The collinear array 101 is fed radio frequency energy by means of a waveguide transmission line through a rotating joint to the transmit-receive components of the system in a substantially conventional manner. Block 140 is to be understood to contain the necessary drive motor, gearing, etc., and is mechanically connected to the azimuth angle transducer 135. The latter device is a straightforward arrangement of synchros geared to the antenna and forming the independent variable in a PPI azimuth indicator follow-up servo. One synchro is arranged to bear a one-to-one rotational relationship to the antenna and another is geared up by a factor so that it rotates N times for every complete antenna revolution. In this way greater accuracy is obtained than is possible in a single synchro system. The available techniques for instrumentation of the PPI "follow-up" servo are variously described in the technical literature, including Chapter 14 of ELECTRONIC INSTRUMENTS — Ridenour (Vol. 21 of the Radiation Laboratory Series — McGraw Hill Book Co., First Edition, 1948) and SERVOMECHANISM PRACTICE — Wm. R. Ahrendt (McGraw Hill Book Co., 1954), Chapter 4 in particular.

Proceeding from the conventional waveguide rotating joint which is located between Azimuth Drive 140 and antenna assembly 101, the principal microwave components comprising duplexer 102, final RF amplifier 103, low level RF amplifier 104 and low noise pre-amplifier 105 are shown. The required transmit-receive duplexing within 102 operates in a conventional manner consistent with the high transmitter power employed, i.e., the duplexer (also referred to as a duplexer-circulator) channels radio frequency power from the final RF amplifier 103 through the waveguide system to antenna array 101 with substantially no power being diverted into the preamplifier 105 during transmitting. Since the system is fundamentally of the pulse type, the intervals between transmitted pulses are used to receive target echoes. Thus, energy received by the array 101 is passed through the duplexer 102 to the low noise pre-amplifier 105 without substantial shunting effect into the arm of the duplexer which connects to 103.

Each transmitted pulse is actually composed of a plurality of pulses progressively differing from each other in microwave frequency in order to effect the desired frequency (inertialess) scanning. For convenience, in the detailed description, representative frequencies, pulse widths and other parameters will be used in the description, although it is to be understood that the invention is by no means restricted to the frequencies or other parameters given.

In Table A, following, is given a typical elevation frequency scan program.

The design of the waveguide transmission line which feeds the individual radiating elements in the collinear array 101 is described in copending U.S. patent application entitled: "Pencil Beam Frequency/Phase Scanning System" filed Aug. 8, 1966, Ser. No. 570,991, now U.S. Pat. No. 3,438,035, and assigned to the same assignee as this application. In that patent application, a "serpentine" feed waveguide is shown and described. The same configuration respecting any one serpentine section from the aforementioned copending application is applicable to the antenna array 101 of the present invention to provide the necessary frequency sensitivity for beam angle scanning in the elevation plane.

Before discussing the information in Table A in more detail, further explanation of the frequency scanning antenna array is germane. The array 101 is preferably composed of a collinear arrangement of dipoles disposed to illuminate the reflector 101a, although other frequency sensitive antenna configurations are known in the art. The electrical orientation of the phase front illuminating the reflector will determine the vertical angle of radiation. Moreover, the said phase front orientation is a function of the frequency of excitation. The horizontal beamwidth is substantially constant and is a function of the shape and size of the reflector 101a in the azimuth plane. If the orientation of the phase front of the illuminating energy is controllable, it will be evident that the vertical angle of radiation is thereby correspondingly controlled. A collinear array such as 101, fed from a continuous waveguide, is known to exhibit this controllable characteristic in response to control of the phase of energization of successive dipoles along the waveguide feed. In U.S. Pat. No. 2,596,966, a method of controlling the energy supplied to successive dipoles fed from a waveguide is shown, based on the control of the larger of the two cross sectional dimensions of the waveguide. This dimension is sometimes referred to as a dimension of the guide and a scanner thus capable of changing its direction of radiation in response to mechanical changes in a dimension is sometimes referred to as a "delta-a" scanner. Reference to the delta-a scanner is made in this description only for assistance in understanding the evolution of frequency scan, since it will be evident that the delta-a scanner is inherently limited by mechanical inertia and therefore is not adaptable for use in the present invention which requires the rapid scan obtainable only by inertialess scanning techniques.

It is also known in the radar arts that variations is the frequency applied to the waveguide transmission line which energizes the collinear dipoles also produce change in energy phase distribution within the waveguide and resulting phase differences in the energy supplied to each successive dipole, and therefore a change in the angle of radiation from the broadside of the collinear array.

The microwave center frequency employed, the transmission line length between successive dipoles and the scan sensitivity (as a function of frequency change) are all interrelated and the serpentine waveguide configuration may therefore be thought of as a design matter for convenience in obtaining the desired rate of change of radiation angle versus frequency consistent with the design requirements of the entire antenna system.

Continuing with reference to FIG. 1, the final RF amplifier 103 is preferably an amplitron, although high powered traveling wave tubes are also possible for this stage. The amplitron bears some structural relationship to the magnetron; however, it is adapted for use as a microwave amplifier, whereas the magnetron may only be used as an oscillator and is, therefore, not suitable for use in circuits of the present invention. The amplitron moreover, can be operated passively, in which condition it acts much like a simple series section of waveguide transmission line. This latter capability of the amplitron is valuable in implementation of power programming. It is also possible for the final RF amplifier 103 to include more than one amplitron stage in cascade whereby more sophisticated power programming may be provided. The function of power programming and its desirability will be discussed more fully later in this description.

Low level RF amplifier 104 preferably comprises a traveling wave tube microwave amplifier, since at the present state of the art the traveling wave tube efficiently provides the necessary broadband power amplification, and the higher power capability of the amplitron is not required at this stage. The low noise preamplifier 105 is preferably of the parametric type which provides a very high order of useful receiving sensitivity in view of its favorable inherent noise figure. Mixer 106 operates in the conventional superheterodyne manner on the received microwave signals from 105 and the local oscillator signal received from the frequency synthesizer 107 via lead 141. The output of mixer 106 is routed to a broadband IF amplifier 108.

Before proceeding with the remaining components in the IF and video system, the elevation frequency scan program of Table A following, and the function of frequency synthesizer 107 and programmer 133 will be explained.

TABLE A

ELEVATION FREQUENCY SCAN PROGRAM (0° – 45° Coverage)

| Elevation Angle | Slant Range | Interpulse Period | Transmitter Power |
|---|---|---|---|
| (degrees) | (naut.miles) | (microseconds) | (pk.megawatts) |
| 0.5–2.5 | 300 | 3800 | 3.0 |
| 2.75–4.75 | 230 | 2850 | 3.0 |
| 5.0–7.0 | 160 | 2000 | 3.0 |
| 7.25–9.25 | 120 | 1550 | 0.5 |
| 9.5–11.5 | 95 | 1300 | 0.5 |
| 0.375–2.375 | 300 | 3800 | 3.0 |
| 2.625–4.625 | 230 | 2850 | 3.0 |
| 11.75–13.75 | 80 | 1050 | 0.5 |
| 14.0–18.0 | 65 | 850 | 0.5 |
| 18.5–22.5 | 50 | 700 | 0.5 |
| 23.0–27.0 | 42 | 600 | 0.05 |
| 27.5–31.5 | 35 | 540 | 0.05 |
| 32.0–36.0 | 32 | 480 | 0.05 |
| 36.5–40.5 | 28 | 430 | 0.05 |
| 41.0–45.0 | 26 | 400 | 0.05 |
|  |  | 23,200 |  |

It is the function of the frequency synthesizer to provide the microwave frequencies which are amplified by 104 and 103 and subsequently transmitted at high power level and also to provide a microwave local oscillator signal to the mixer 106. For the purpose of understanding the frequency synthesizer function and its relationship to the frequency scan and elevation, reference is made to FIG. 2.

The prior art technique of distributing the transmitted energy of a PPI radar in the vertical plane in accordance with a cosecant squared function provides for fill-in of high angle coverage ignored by the ordinary fan beam. The system, according to the present invention, on the other hand, employs multiple pencil-beams, generated in groups of nine with each beam having an elevation angle corresponding to a discrete transmitter or incident wave frequency. By means of the inertialess frequency scan system of the present invention, the pencil-beam is caused to sweep in small angular steps through the entire vertical sector (typically 45°) repetitively as the azimuth scan is being continuously but much more slowly carried out (by mechanical rotation of the antenna system in the herein depicted instrumentation).

Referring now to Table A above, the elevation frequency scan program, it will be noted that this entire elevation angle at 45° is scanned in a period of 23,200 microseconds (0.0232 seconds). The azimuth antenna which is continuously rotating, will have traversed a small increment of azimuth angle during this 0.0232 seconds, however, by proper choice of the azimuth rotational speed and azimuth angular coverage of the individual pencil-beams, the effect on received signals can be made negligible. For example, even at the relatively fast azimuth rotation rate of 6 revolutions per minute, (36° per second) the azimuth antenna will have traversed only 1.26° during each complete elevation sweep, which is well within the nominal typical azimuth beamwidth of 2° for the individual pencil-beams.

The frequency synthesizer 107 actually varies the frequency within each transmitted pulse into nine discrete intervals of 3 microseconds each (disregarding the negligible time required to switch from one discrete frequency to another) so that the total duration of each transmitted pulse envelope is nine times the said 3 microseconds.

Thus it will be seen that during each 27 microsecond transmitted pulse, the pencil-beam moves in nine discrete steps. Considering any one Table A entry arbitrarily, for example, the eighth entry in Table A, the pencil-beam will scan vertically from 11.75° to 13.75°, or 2° net, in ¼° steps. If the pencil-beams are individually ¾° in width in the elevation plane, a point target will be "seen" by three consecutive pencil-beams during this frequency scanning process.

In the present invention, as in any long range high altitude coverage radar equipment, the required echo ranging time and the required power to achieve minimum detectable echo signal decrease in accordance with the geometric situation as a target at any given altitude progresses toward the radar site until both of these parameters are minimized when the target is directly overhead. Although the present invention is inherently capable of a full (90°) vertical coverage, the design requirement of horizon to 45° is all that is usually operationally necessary. Accordingly, Table A programs only to the 45° elevation angle. It will be noted that the interpulse period (Col. 3 of Table A) is shortened as the vertical angle increases and likewise the peak transmitted power is also programmed downward as the beam scans to higher elevation. The maximum non-ambiguous range (in nautical miles) is readily calculated from the interpulse period by multiplying the latter by C (where C is the speed of electromagnetic propagation).

In referring to the amplitron previously, it was noted that this device is capable of passive transmission such that the requirements for efficient programming of transmitted power given in Table A are readily implemented. If the final amplifier 103 contains two amplitrons in cascade, capable of providing the full 3.0 megawatts of peak power when both are energized, the reduction to 0.5 megawatts is achieved by passive operation of the last amplitron stage, permitting the 0.5 megawatt output of the penultimate amplitron stage within 103 to be transmitted. Passive operation of both amplitrons in 103 would permit the transmission of the 0.05 megawatt output of the low-level RF amplifier 104.

Having accomplished the above general explanation of the elevation frequency scan program of Table A, it will be possible to consider the somewhat more sophisticated and realistic elevation frequency scan program with interlace shown in Table B following, since it will now be thoroughly understood how the elevation scan is implemented with the antenna array which is inherently and intentionally frequency sensitive.

TABLE B

| ELEVATION FREQUENCY SCAN PROGRAM WITH INTERLACE | | | | | |
|---|---|---|---|---|---|
| Elev. Angle (degrees) | Max. Range (naut. mi.) | Interpulse Period (microsec) | Xmtr Power (pk mw) | Xmtr Freq. (mc/sec) | LO Freq. (mc/sec) |
| 0.39 to 2.47 | 300 | 3800 | 3.0 | 3090 to 3082 | 3054 |
| 0.39 to 2.47 | 300 | 3800 | 3.0 | 3090 to 3082 | 3054 |
| 2.73 to 4.81 | 230 | 2850 | 3.0 | 3081 to 3073 | 3045 |
| 5.07 to 7.15 | 160 | 2000 | 3.0 | 3072 to 3064 | 3036 |
| 7.41 to 9.49 | 120 | 1550 | 0.50 | 3063 to 3055 | 3027 |
| 9.75 to 11.83 | 95 | 1300 | 0.50 | 3054 to 3046 | 3018 |
| 0.52 to 2.60 | 300 | 3800 | 3.0 | 3089.5 to 3081.5 | 3053.5 |
| 0.52 to 2.60 | 300 | 3800 | 3.0 | 3089.5 to 3081.5 | 3053.5 |
| 2.86 to 4.94 | 230 | 2850 | 3.0 | 3080.5 to 3072.5 | 3044.5 |
| 12.09 to 14.17 | 80 | 1050 | 0.50 | 3045 to 3037 | 3009 |
| 14.43 to | | | | 3036 to | |

TABLE B-continued

ELEVATION FREQUENCY SCAN PROGRAM WITH INTERLACE

| Elev. Angle (degrees) | Max. Range (naut. mi.) | Interpulse Period (microsec) | Xmtr Power (pk mw) | Xmtr Freq. (mc/sec) | LO Freq. (mc/sec) |
|---|---|---|---|---|---|
| 18.59 | 65 | 850 | 0.50 | 3020 | 3000 |
| 19.11 to 23.27 | 50 | 700 | 0.50 | 3018 to 3002 | 2982 |
| 23.79 to 27.95 | 42 | 600 | 0.05 | 3000 to 2984 | 2964 |
| 28.47 to 32.63 | 35 | 540 | 0.05 | 2982 to 2966 | 2946 |
| 33.15 to 37.31 | 32 | 480 | 0.05 | 2964 to 2948 | 2928 |
| 37.83 to 41.99 | 28 | 430 | 0.05 | 2946 to 2930 | 2910 |
| 42.51 to 46.67 | 26 | 400 | 0.05 | 2928 to 2912 | 2892 |
| | | 30,800 | (Total elev. scan period) | | |

In a practical embodiment of the invention, the antenna was designed to have a spread in the angle of radiation in the vertical (elevation) plane of 46.28° corresponding to a total antenna excitation frequency spread from 3090 to 2912 megacycles. The fact that the angle of radiation is an inverse function of frequency, i.e., the beam scans upward corresponding to a decrease in frequency, is a matter of design convenience. It is also possible to construct a system according to the present invention in which the direction of elevation scan versus excitation frequency would be the converse simply by changing the direction of energy feed into the serpentine waveguide transmission line. The measurement of elevation angles in Table B are given with respect to the horizontal. The fact that the angles of radiation with respect to a broadside normal from the array would be shifted by some angle is compensated by canting the vertical axis of the array, in order to obtain the desired angles of scan with respect to the physical space situation. The relationships of maximum range and interpulse period as shown in Table B are fundamentally the same as those described in connection with Table A; however, it will be noted that the lowest scan group of nine pulses corresponding to the angle from 0.39° to 2.47° is repeated. This has the effect of enhancing the target hit probability at the lowest angles of interest, the area in which the range and interpulse period are greatest, and hence, in which the range data rate is lowest. The repetition of this 0.39° to 2.47° sector also provides a convenient means of adding moving target indicator circuitries without significant degradation of the minimum signal detectability at long ranges. It will be noted that after 11.83°, the scan returns to 0.52° and interlaces with new groups of nine pulses to further enhance long range performance of the entire system. The 0.52° to 2.60° scan group is also repeated for the same reasons applicable to the 0.39° to 2.47° group. This "double-stepping" is made possible because, as explained previously, the maximum range necessary at the higher angles is much less, thereby allowing higher repetition rates and therefore no sacrifice of data rate. By using a double step, each scan group covers a larger angle (8 times 0.52°) the total scan time is reduced and time thereby saved is available for interlace. The programming of scan angle, interpulse period, and transmitter power evident in Table B may be thought of as having the same effect on the net vertical plane coverage as is obtainable in the ordinary PPI configuration through the use of a cosecant squared antenna pattern, but with a much higher data rate. Moreover, power programming has the effect of conserving the average power handling capability of the transmitting components, thereby making larger peak power available at longer range lower scan angles in exchange for reduction of peak power at high angles.

The frequency synthesizer illustrated at 107 in FIG. 1 is the frequency generating heart of the system for producing the elevation scan program outlined in Table B and is shown in detail in FIG. 2. Coarse elevation crystal oscillators 201 through 215 generate frequencies ranging (in the example scan program of Table B) from 255.4 megacycles down to 239.2 megacycles in 15 discrete steps. Each of these coarse scan control frequencies corresponds to one line across Table B with the exception that lines 1 and 2 and lines 7 and 8 on Table B are duplicate scans for reasons already stated. Accordingly, the 15 discrete coarse elevation oscillators correspond to the 15 different lines on Table B.

Programmer 133, illustrated in FIG. 1, is the system timer and controller which supplies the necessary gating, synchronizing and power program control signals to the frequency synthesizer 107 via lead 134 and also to the final RF amplifier 103 (via 143 and 144) the PPI 131 (via 137) and RHI 132 (via 136). The necessary circuitry in the programmer 133 is essentially a subcombination of well known gating and logic circuitry based on the system requirements. Alternatively, such a program can be constructed and multi-track recorded magnetically (for example) such that it can be cycled automatically to fulfill the programming requirement. Referring now also to FIG. 2, it will be noted that the group of control signals 134 from the programmer include those applied to the coarse elevation oscillators 201 through 215 gate each of these oscillators on for 27 microseconds, the time corresponding to a full nine increment frequency scan group as discussed previously.

Since the system being described is inherently intended for high accuracy elevation determination, as well as development of highly efficient volumetric surveillance scanning, certain refinements are provided to compensate for various undesired effects, such as wobbling or tilting of the antenna array as it scans around in the azimuth plane, and change of the scanning antenna angle-versus-frequency relationship due to expansion or contraction caused by temperature changes. There are various techniques for providing a correction as a function of antenna tilt, one of these involves the use of an optical system including a photocell for detecting tilt and converting it to an analog signal. Whatever particular instrumentation is applied to tilt detection, the function is that of a mechanical motion-to-electrical signal transducer. On FIG. 2, inputs from such a transducer are applied at 263 to nine tilt correction oscillators 250 through 258. When the tilt error is negligibly small, tilt correction oscillator 254 would be energized, providing an output of 250 megacycles to mixer 247. Tilt correction signals from the transducer will then vary this frequency from 246 megacycles to 254 megacycles, with resultant compensating effect on the angle of radiation such as to preserve the space angle relationships. This will be more fully understood as the description of FIG. 2 proceeds.

A temperature correction oscillator 244 normally provides a 25 megacycle signal at 266 into mixer 265 (along with the coarse elevation oscillator output on lead 267), but will vary this a few percent plus or minus in response to a control signal on lead 261 as a function of the temperature of the antenna array. A temperature sensing device located in thermal contact with the array would provide such a control signal. In this way, the effect of array temperature variations on the angle of scan are compensated.

The coarse elevation oscillators (201 through 215) which establish a "base" frequency for each nine increment frequency scan group are gated on successively and each remains on for a full 27 microsecond interval in accordance with control (gating) signals supplied by the programmer, in the control signal group identified as 134. Whatever the coarse elevation frequency at any time, the nominal 25 megacycle center frequency temperature correction signal from 244 is added to it in mixer 265. Thus, the output of 265 at lead 268, ranges from 280.4 to 264.2 megacycles. Element 246 functions as a broadband multiplier (X10) connected to mixer 265, and whose output consequently varies between 2804 and 2642 megacycles at lead 264.

It will be noted that the output of 246 feeds two additional mixers, 247 and 248 which produce the Receiver local oscillator and transmitter exciter signals, respectively.

The tilt correction signal of 250 megacycles plus or minus 4 megacycles, is fed on lead 269 to mixer 247, and, accordingly, the local oscillator signal which is the output 141 of 247 is the sum of these tilt correction signals and the output of multiplier 246. This local oscillator signal output 141 is fed to the receiver mixer 106, (as illustrated in FIG. 1). The tilt correction signal is also fed to mixer 249 along with the output 259 of the particular gated-on vernier crystal oscillator from the 216 through 238 bank. The sum of these two frequencies, varying between 286 and 270 megacycles plus or minus the 4 megacycles tilt correction, is fed to mixer 248 along with the output of the broadband multiplier 246. The sum of these three frequencies, varying between 3090 and 2912 megacycles, appears at the transmitter exciter signal output 142 and is fed to the low level RF amplifier 104 (as illustrated on FIG. 1). Thus the difference in frequency between the local oscillator signal output 141 and the transmitter exciter signal output 142 is determined by the particular gated-on vernier crystal oscillator.

The vernier oscillators 216 through 228 actually free run and their outputs are switched to mixer 249 appropriately via switch gates 229 through 241, respectively. Single step generator 242 and double step generator 243 each receive enabling signals from the programmer 133 as a part of the control signal package 134. Said step generators also receive a system or synchronizing trigger 262 from which they program out frequency steps from the vernier oscillators 216 through 228 of either 1 or 2 megacycles per step to mixer 249, in accordance with the programming requirements. The output of mixer 249 at lead 260 will be seen to be mixed with the coarse oscillator signals and temperature corrections in mixer 248 to produce the transmitter exciter signals on lead 142.

If the 36 megacycle oscillator 216 is assumed to be gated through in a given period, then the intermediate frequency is also 36 megacycles. The same holds true for the 35 megacycle oscillator 217, etc. Thus, for one 27 microsecond scan period nine 3-microsecond pulses) there will be nine different intermediate frequencies, each separated by 1 megacycle (single step scanning) during the lower elevation scan angles and 2 megacycles (double step scanning) during the upper scan angles. This would result in 13 distinct intermediate frequencies at predetermined periods at the output of mixer 106, during a full elevation scan cycle which will in turn require 13 narrow-band intermediate frequency amplifiers in order to separate the signals according to angle.

Although, for practical operation, the system shown in FIG. 1 would require 13 narrow-band IF amplifiers to accommodate nine elevation angle channels, for simplicity only i-f amplifiers 112 through 120 are shown, since they are the ones required during the 1–2 megacycle scan step program.

Broadband IF amplifier 108, which also serves as a buffer amplifier, receives the intermediate frequency signal output from mixer 106. In one practical embodiment consistent with the frequencies given on FIG. 2, amplifier 108 has a bandwidth of 22.5 megacycles centered at 30 megacycles, with an approximate overall gain of 30 db. Thus, the various RF frequencies ranging from approximately 20 to 40 megacycles are uniformally amplified and distributed to intermediate width IF amplifiers 109, 110 and 111, thence on to 112 through 120. From an understanding of this process, the center frequencies and bandwidths of the intermediate and narrow width IF amplifiers will be readily deduced.

The transmitter chain comprises the active components in 103 and 104. Since the amplitrons respond as microwave amplifiers when pulsed and as sections of transmission line when not pulsed, lines 143 and 144 may be regarded as amplitron pulse modulator stage enabling signals from the programmer 133 to implement power programming.

Considering the flight of an aircraft at constant altitude approaching the radar antenna from maximum range, it will be evident that as range decreases the vertical angle of the target increases until the range and altitude are equal when the target is directly overhead. Since range determines the radar power necessary to derive a predetermined signal return from a given target (according to the basic radar equation) the radar power for close-in high angle targets will be seen to be greatly reduced as compared to that required for long ranges (low angles). In a practical instrumentation of the system of the present invention, the vertical scan angle of coverage is divided into sectors. During the lowest sector, full power is employed and enabling signals for both stages in 103 would be present on 143 and 144. If 144 conveys the signal enabling the final (highest power) amplitron stage, this signal would be absent during the next sector of the scan, and for the highest sector, the signal would also be absent from 143 so that the lowest transmitted power program would be in use.

The transmitter chain receives a low-power driving signal from the frequency synthesizer at the RF signal input 142. This signal consists of the 27 microsecond pulse whose frequency is programmed to shift in nine discrete steps within a prescribed frequency range as outlined hereinbefore. Since the antenna is frequency sensitive, this frequency shift results in an essentially contemporaneous transmission of energy at nine discrete elevation angles within a prescribed elevation sector.

The output power is programmed as a function of elevation angle in order to obtain optimum spatial distribution of the available average power capability of the equipment.

Since the programming of power, and for that matter, spacing of the beams, is controlled by a logical computer, and since the frequency scanning is essentially inertialess, there is virtually no limit to the flexibility of the elevation scan and power programs. Inclusion of any type of scan interlace, variation of the elevation angular spacing of successive beams, and even variation of the basic pulse repetition rate are all possible because of this flexibility.

In a practical model of the system of the present invention, this is accomplished by selective pulsing beginning with all stages to generate the maximum power of 3.0 megawatts peak over the lowest seven degrees of elevation angular scan. For the intermediate elevation scan angles (7°–24°) the final amplitron modulator is disabled and the system operates on the driver amplitron power of 0.5 megawatts. For the high elevation angles (24°–45°) the driver amplitron is also disabled and the system operates on the output power of approximately 50 kilowatts from the lower level RF driver.

The nine beams of the present system are normally spaced in elevation angle by an amount equal to or less than their individual widths. Typical center to center beam spacing in elevation is 0.6° and typical beam width in elevation is 1.6°, and accordingly, any given target will be illuminated by three beams at any one time. The maximum reflection energy will, of course, be at the frequency of the beam which provides the greatest illumination for any given target. The outputs of the narrow band IF amplifier/ detector circuits 112 through 120 are separately provided to the RHI (Range Height Indicator) 132, where they are presented on a cathode ray display. The RHI is synchronously swept in accordance with synchronizing signals representative of the elevation program from the programmer 133 via lead 136. In this way the elevation versus range of targets received may be presented on any known type of RHI coordinate presentation.

The presentation of the PPI (Plan Position Indicator) requires the condensation (collapse) of signal data from all scanned elevation angles over each complete cycle of elevation scan in order that all signals will be presented as a function of range and bearing only, without regard to elevation. The ordinary prior art PPI employing a fan beam presents a polar plot of target echoes with regard only to range and bearing and irrespective of elevation. The present invention provides for combining or collapsing the elevation beam data while providing improved PPI performance which will be evident as this description proceeds.

The combining of the beam echoes within each nine beam group is accomplished in video processor 130. FIG. 1 illustrates nine inputs for 130 from the narrow band IF amplifier/detector blocks 112 to 120 inclusive, through delay lines 121 to 129 inclusive, respectively. For system functional purposes, the nine beams corresponding to the nine discrete successive frequencies in the 27 microsecond transmitter envelope are usually regarded as substantially simultaneous. However, since this is not strictly true, the delay lines 121 through 129 are inserted to "line up" the video into time coincidence. The last 3 microsecond frequency pulse of the group would, strictly speaking, not need to be delayed except for other system reasons such as compensation for indicator sweep circuit delays, etc.

Referring now to FIG. 3, the structure and operation of the video processor 130 will be explained.

The nine channel video which is now time-correlated by the delay lines 121 to 129, is fed into the video processor on Input video Channel leads 1 to 9 (FIG. 3).

It will be recalled that the width and spacing in the elevation plane of the individual beams is such that three beams illuminate any one target at any given time. Although it is desired to add all video signals in all nine beams at corresponding ranges, the addition of all beams at once would evolve the addition of six of the nine channels containing only noise at any specific target range where a specific target would be represented in three of the channels. Thus, such an addition would result in deterioration of the signals-to-noise ratio in the resulting sum signal as compared to any of the individual channels.

By adding the signal channels in overlapping threes, (i.e., the first, second and third in one addition and then the second, third and fourth in a second addition, etc.), as shown on FIG. 3, it is possible to avoid the addition of noise-only channels in the particular adder which contains the three signals. For N channels added three at a time as above, N minus two adders are required, i.e., seven adders (301 to 307) for the nine channels.

To illustrate the construction of each of the summing amplifiers, a video amplifier 311 and summing resistors 308, 309, and 310 are shown in summing amplifier block 301. The said resistors 308, 309, and 310 are each in series with one of the three video channel inputs to 301. The construction of 302 through 307 is to be understood to be identical to 301.

The addition of three adjacent beam channels in each summing amplifier produces an output such as at 312 from 301 which has a more favorable signal-to-noise ratio by 3 decibels than any individual input. This is because the time coherent video signals add directly, whereas the noise is random and sums as the root mean square (rms) rather than the direct algebraic sum of noise amplitudes.

It will be noted that base clippers 313 to 319 inclusive receive the outputs of 301 to 307 inclusive, respectively. It is the function of these base clippers to pass only the signal and noise amplitudes in excess of an arbitrarily determined threshold level. Since the base clippers receive signals having enhanced signal-to-noise ratios, this base clipping can eliminate much of the "grass" (noise level) without loss of significant signal information.

In accordance with the foregoing, the combining amplifier 320 receives seven further enhanced signals, so that the loss of signal-to-noise ratio resulting from combining useful video channels with noise-only channels is minimized.

Resistors 321 through 327 act in the same manner to combine signals and noise into the input of video amplifier 328 to produce output 139.

Of further interest is the fact that the percentage of the base clipper outputs containing signal in a typical case is greater than the percentage of input video channels containing signal. For example, recalling that, because of beam overlap, three adjacent beams will see any given target in the same scan period, assume that inputs 5, 6, and 7 contain signal (33⅓% of the nine channels). Correspondingly, base clippers 315, 316, 317, 318, and 319 will each have some signal, 317 having the greatest signal energy. Thus, five of the seven inputs to combiner 320 have signal in the given example (over 70% of the seven base clipper outputs). The total overall signal enhancement thus may exceed the 3 decibel gain in signal-to-noise in each summing amplifier which has full video inputs.

Referring again to FIG. 1, the combined signal 139 then constitutes the video signal to the PPI 131, as the adding and combining process is repeated for each nine beam scan group throughout the elevation sector. The individual signal group 138 includes the nine individual signals to the RHI (Range Height Indicator) 132, as will be seen on FIG. 1.

From the foregoing description, the structure and operation of the present invention will be apparent to those skilled in the art. Modification and variations falling within the scope of the present invention concepts will suggest themselves to those skilled in the art and it is not intended that the invention claimed should be limited to the specific embodiment illustrated in the drawings or described in this specification.

What is claimed is:

1. A pulsed radar system for displaying at least plan position indicator information, comprising: a directive antenna for radiating a beam of electromagnetic energy which is narrow and directable in the elevation plane as a function of frequency of excitation; means for providing said excitation to said antenna in the form of bursts of high frequency electrical energy of progressively variable frequency from burst-to-burst to produce a discrete transmitted beam in said elevation plane corresponding to each of said bursts; means for programming said frequency variations cyclically so that each cycle of said frequency variations corresponds to a cycle of scan in said elevation plane, said frequency variation programming being predetermined to cause said beams corresponding to said frequency bursts to be sufficiently closely spaced in angle so that more than one of said beams illuminates a given target in any one of said scan cycles; means for receiving and separating echo signals of said radiated electromagnetic energy according to received frequency thereby to produce a plurality of outputs; delay means responsive to said outputs for delaying at least a portion of the signals on said outputs selectively so that echo signals from the same range occur at the same instant of time in all delayed outputs; and means for producing a cyclical series of composite signals each including substantially all of said echo signals received within any one of said cycles of scan by adding said delayed outputs synchronously and algebraically thereby to cause the included noise components to add asynchronously to produce an improved signal-to-noise ratio in said composite signals.

2. A pulsed radar system for displaying at least plan position indicator information, comprising: a directive antenna for radiating a pencil beam of electromagnetic energy which is directable in the elevation plane as a function of frequency of excitation and which is directable at a relatively slower rate in the azimuth plane in response to separate azimuth scan means; means for cyclically exciting said antenna with pulses of high frequency electrical energy, said pulses each comprising a plurality of successive bursts each beginning with a different first frequency which is modified progressively with each of said bursts throughout each of said pulses to produce a series of multi-beam groups each covering a corresponding sector in the vertical plane with at least some angular overlap of the beams within said multi-beam groups; means operative to permit reception of echo signals between said transmitted pulses in the same angle versus frequency relationship as transmitted through said antenna to produce a plurality of separate output signals; delay means responsive to said separate output signals to produce time correspondence of said separate output signals; and summation means for algebraically summing said delayed separate output signals over each interval of reception to produce a composite signal, thereby to provide an improved signal-to-noise ratio in said composite signal.

3. The invention set forth in claim 2 in which said separate azimuth scan means includes means for providing mechanical rotation of said antenna cyclically through at least a portion of the 360° azimuth circle at a rate such that the time elapsed during each cycle of said scan of the total elevation angle of interest is negligible compared to the time required for a cycle of said azimuth scan.

4. The invention set forth in claim 2 further defined in that said successive bursts are defined as being spaced in frequency so that adjacent corresponding beams overlap in angular coverage by an amount less than one half beam width, said beam width being measured between half power points.

5. The invention set forth in claim 2 further defined in that said successive bursts are defined as being spaced in frequency so that adjacent corresponding beams overlap in angular coverage by an amount substantially equal to one half beam width, said beam width being measured between half power points.

6. The invention set forth in claim 2 further defined in that said successive bursts are defined as being spaced in frequency so that adjacent corresponding beams overlap in angular coverage by an amount at least equal to one half beam width but less than the full width of said beams, said beam width being measured between half power points.

7. The invention set forth in claim 2 further defined in that said successive bursts within each of said pulses are defined as being spaced in frequency so that adjacent corresponding beams overlap in angular coverage by an amount sufficient to effect illumination of any given target by not less than three adjacent ones of said beams.

8. The invention set forth in claim 7 in which said signal summation means is further defined as including N-2 first adder circuits arranged to receive N signal inputs corresponding to said echo signals whereby each of said first adder circuits receives an adjacent three of said echo signals but no one of said first adder circuits receives the same three of said echo signals; at least N-3 of the outputs of said first adder circuits are individually delayed in at least N-3 delay circuits by a time sufficient to cause the video signals in said outputs to be in time coincidence; and an additional adder circuit is provided for adding said N-2 time coincident video signals to produce said composite signal.

9. The invention set forth in claim 8 further defined in that N-2 base clipping circuits are included, one of said base clipping circuits being connected between the output of each of said first adder circuits and said additional adder circuit, said base clipping circuits operating to pass only those signal and noise amplitudes in excess of a predetermined threshold level.

10. The invention set forth in claim 8 wherein said first adders and said additional adders are each constructed such that each input feeds a common finite impedance amplifier input through a series impedance element.

* * * * *